United States Patent
Tucker et al.

(10) Patent No.: US 9,796,479 B2
(45) Date of Patent: Oct. 24, 2017

(54) SELF-REFERENCING SENSORS FOR AIRCRAFT MONITORING

(71) Applicant: Bell Helicopter Textron Inc., Fort Worth, TX (US)

(72) Inventors: Brian Tucker, Fort Worth, TX (US); Kevin Conrad, Mansfield, TX (US); Chris Thompson, Euless, TX (US); Brandon Johnson, Dallas, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 14/622,403

(22) Filed: Feb. 13, 2015

(65) Prior Publication Data
US 2016/0236794 A1 Aug. 18, 2016

(51) Int. Cl.
*B64D 43/02* (2006.01)
*B64D 45/00* (2006.01)
(Continued)

(52) U.S. Cl.
CPC ........... *B64D 43/02* (2013.01); *B64D 45/00* (2013.01); *G01M 17/007* (2013.01); *B64D 2045/0085* (2013.01); *B64F 5/60* (2017.01)

(58) Field of Classification Search
CPC .. G06F 11/3013; G06F 11/30–11/3006; G06F 11/3058; G06F 11/3086; G01M 17/007; B64D 45/00; B64D 2045/0085; B64D 43/00–43/02; B64D 47/00; H04W 84/06; G01C 21/00; G01P 5/00; G01P 13/025; H04Q 9/00; H04Q 2209/40; H04Q 2209/47; H04Q 2209/80
(Continued)

(56) References Cited

U.S. PATENT DOCUMENTS

| | | | |
|---|---|---|---|
| 8,738,925 B1 * | 5/2014 | Park | H04B 7/26 380/270 |
| 8,981,967 B1 * | 3/2015 | Shore | B64F 5/00 340/945 |

(Continued)

FOREIGN PATENT DOCUMENTS

| | | |
|---|---|---|
| DE | 102009009189 | 8/2010 |
| EP | 2703297 | 3/2014 |

OTHER PUBLICATIONS

Determine_Definition of Determine by Merriam-Webster.pdf (Determine | Definition of Determine by Merriam-Webster, Nov. 8, 2016, http://www.merriam-webster.com/dictionary/determine, pp. 1-8).*

(Continued)

*Primary Examiner* — Bao Long T Nguyen

(57) ABSTRACT

An aircraft monitoring system includes multiple wireless aircraft sensors and multiple meta sensors mounted on-board an aircraft. Each wireless aircraft sensor is configured to sense an aircraft parameter. Each meta sensor is associated with an aircraft sensor and is configured to determine a location or orientation on the aircraft of the aircraft sensor. A data acquisition system mounted on-board the aircraft and connected to the multiple aircraft sensors and the multiple meta sensors can perform aircraft monitoring operations based on the sensed aircraft parameters and on a location or orientation of the aircraft sensors.

48 Claims, 4 Drawing Sheets

(51) Int. Cl.
*G01M 17/007* (2006.01)
*B64F 5/60* (2017.01)

(58) Field of Classification Search
USPC ............... 701/3–4, 7, 14, 408, 468; 244/194
See application file for complete search history.

(56) References Cited

U.S. PATENT DOCUMENTS

| | | |
|---|---|---|
| 2008/0074276 A1 | 3/2008 | Valencia et al. |
| 2011/0299470 A1 | 12/2011 | Muller |
| 2012/0179326 A1 | 7/2012 | Ghelam |
| 2014/0114549 A1 | 4/2014 | Ziarno |
| 2014/0145025 A1* | 5/2014 | Fang .................... B64C 27/008 244/17.11 |
| 2014/0257603 A1* | 9/2014 | McKeown ............. B64D 45/00 701/16 |

OTHER PUBLICATIONS

Acquire synonyms.pdf (Synonyms for acquire,Nov. 8, 2016, http://www.synonyms.net/synonym/acquire, pp. 1-13).*
Determine synonyms.pdf (Synonyms for determine, Nov. 8, 2016, http://www.synonyms.net/synonym/determine, pp. 1-14).*
European Search Report in EP Application No. 15188433.5 issued on Feb. 3, 2016, 3 pages.
Communication pursuant to Article 94(3) EPC in EP Application No. 15188433.5 issued Feb. 25, 2016, 6 pages.

* cited by examiner

SELF-REFERENCING SENSORS FOR AIRCRAFT MONITORING

TECHNICAL FIELD

This disclosure relates to sensor-based monitoring, for example, of aircrafts.

BACKGROUND

Vehicle monitoring systems, e.g., aircraft monitoring systems or other vehicle monitoring systems, implement multiple sensors which can be disposed on different locations on the vehicle. Each sensor is configured to sense a vehicle parameter. Using parameters sensed by the multiple sensors, the vehicle monitoring system can make decisions associated with the vehicle's safety, maintenance, operational capabilities and the like. In addition to knowing a parameter that a sensor can sense, the vehicle monitoring system will benefit from knowing where on the vehicle the sensor is located.

SUMMARY

This disclosure describes flexible sensor networks on moving assets. This disclosure describes self-referencing sensors for aircraft monitoring.

Some implementations of the subject matter can be described as an aircraft monitoring system. Multiple wireless aircraft sensors are mounted on-board an aircraft. Each aircraft sensor is configured to sense an aircraft parameter. Multiple meta sensors are mounted on-board the aircraft. Each meta sensor is associated with a respective aircraft sensor. Each meta sensor is configured to determine a location or orientation on the aircraft of the respective aircraft sensor with which each meta sensor is associated. A data acquisition system is mounted on-board the aircraft and connected to the multiple aircraft sensors. The data acquisition system includes a computer-readable medium storing instructions executable by one or more processors to perform operations comprising aircraft monitoring operations based, in part, on aircraft parameters sensed by one or more of the multiple aircraft sensors and on a location or orientation of the one or more of the multiple aircraft sensors determined by respective one or more of the meta sensors.

This, and other aspects, can include one or more of the following features. Performing aircraft monitoring operations can include receiving, from one or more of the multiple aircraft sensors, multiple first signals indicating aircraft parameters that the one or more of the multiple aircraft sensors are configured to sense. Performing aircraft monitoring operations can include receiving, from one or more of the multiple meta sensors, multiple second signals indicating locations or orientations on the aircraft of one or more of the multiple aircraft sensors. In response to and based on the multiple first signals and the multiple second signals, one or more aircraft monitoring operations that the aircraft monitoring system can perform can be identified using the aircraft parameters that the one or more of the multiple aircraft sensors are configured to sense and the locations or orientations (or both) on the aircraft of the one or more of the multiple aircraft sensors. To identify the one or more aircraft monitoring operations, multiple aircraft operations, one or more aircraft sensors to perform each stored aircraft monitoring operation, and a location on-board the aircraft of each of the one or more aircraft sensors to perform each aircraft monitoring operation can be stored. The stored aircraft sensors can be compared to the one or more of the multiple aircraft sensors from which the multiple first signals are received. The stored locations can be compared with the locations of the one or more of the multiple aircraft sensors. An aircraft monitoring operation to be performed can be identified. An aircraft sensor to perform the identified aircraft monitoring operation can be identified. A location or orientation on-board the aircraft at which the identified aircraft sensor is to be mounted to perform the identified aircraft monitoring operation can be identified. In response to and based on the multiple first signals or the multiple second signals, it can be determined that the identified aircraft sensor is not among the multiple aircraft sensors or that the identified aircraft sensor is not mounted at the identified location or orientation. In response to determining that the identified aircraft sensor is not among the multiple aircraft sensors or that the identified aircraft sensor is not mounted at the identified location or orientation, it can be determined that the identified aircraft monitoring operation cannot be performed. A notification indicating that the identified aircraft monitoring operation cannot be performed can be provided. The multiple first signals can be received, the multiple second signals can be received and the one or more aircraft monitoring operations can be identified at a time of aircraft boot up or at a time immediately before aircraft shut down. An indication of the identified one or more aircraft monitoring operations that the aircraft monitoring system can perform can be provided to on-board aircraft controllers. An aircraft sensor and a meta sensor associated with the aircraft sensor can be housed in the same sensor housing. The meta sensor can be configured to self-locate or self-orient. A self-location signal can be received by or from the meta sensor identifying an on-board location and orientation on the aircraft of the meta sensor. It can be determined that the aircraft sensor is located at the identified on-board location and orientation. Multiple location reference transmitters can be mounted on-board the aircraft at respective specified locations. A meta sensor can be configured to connect with one or more of the multiple location reference transmitters and to determine a location on the aircraft of an aircraft sensor with which the meta sensor is associated based on one or more specified locations of the respective one or more of the multiple location reference transmitters. A location transmitter can be mounted on at least one of a nose of the aircraft, a tail of the aircraft, near a seat of the aircraft, on the left or the right of the aircraft, or near the top or the bottom of the aircraft. The multiple meta sensors can be configured to connect to a Global Positioning System (GPS) or receive data from GPS satellites (or both). A meta sensor can be configured to determine a location on the aircraft of an aircraft sensor with which the meta sensor is associated based on location information received from the GPS. A meta sensor can be configured to implement near-field communication to determine a location on the aircraft of a respective aircraft sensor with which the meta sensor is associated. The near-field communication can include radio frequency identification (RFID). A meta sensor can include at least one of an inclinometer or a magnetometer. The multiple meta sensors can be wireless meta sensors. The aircraft monitoring operations can include at least one of rotor balance tracking, vibration health monitoring, temperature sensing, humidity sensing, structural health monitoring, or strain measurement. The multiple aircraft sensors can include at least two of an accelerometer, a tachometer, a thermometer, acoustic emission sensor, piezoelectric transducer, humidity sensor, pressure sensor, flow sensor, or a strain gauge.

Some implementations of the subject matter can be implemented as a method performed by the aircraft monitoring system described here. Some implementations of the subject matter can be implemented as a computer-readable medium storing instructions executable by one or more processors to perform the operations performed by the aircraft monitoring system described here.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
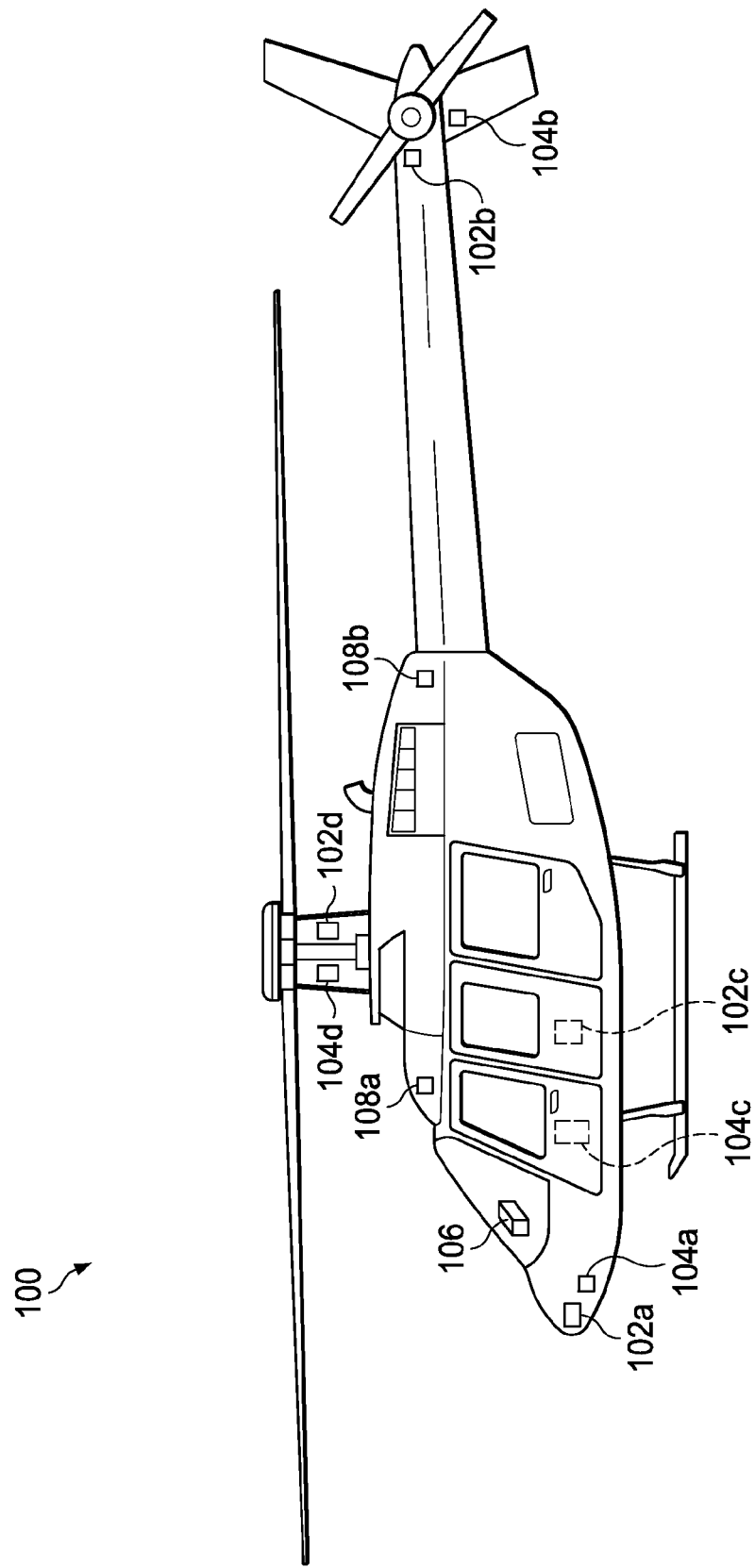
FIG. 1A is a schematic diagram of a first aircraft on which wireless aircraft sensors and meta sensors have been mounted.

Certain aircraft monitoring systems require a one-to-one configuration assignment of aircraft sensors to monitoring channels to ensure that recorded data is associated with correct labels, e.g., metadata, such as sensor location, orientation, or other metadata. Without this control, recorded data may have no context or be associated with the wrong context. One technique to accomplish this one-to-one configuration is by using wired aircraft sensors. For example, each aircraft sensor is wired to a specified monitoring channel on a data acquisition system. If additional aircraft sensors are to be subsequently added, the configuration can be updated, e.g., by removing existing aircraft sensors to accommodate new aircraft sensors. Keeping data sources synchronized between old aircraft sensor installations and new aircraft sensor installations can be difficult. Consequently, changes in such wired configurations may be made only when absolutely necessary.

An alternative to such wired configurations can be implemented using wireless aircraft sensors. Such sensors can reduce a need to provide physical connections (e.g., wires) to the data acquisition system. However, this benefit can be offset by an increased burden in configuration management. That is, wireless aircraft sensors are more susceptible than wired sensors to being associated with wrong labels (e.g., location, orientation or other labels). In wireless configurations, it is often assumed that a wireless sensor is properly associated with its correct monitoring channel. Verification can require manual audits and/or functional checks, and can be costly, difficult and time consuming. Further, an existing problem, i.e., a mismatch between a wireless aircraft sensor and its monitoring channel, may be found after considerable data has been received. Such incorrect data can affect aircraft safety or maintenance or both. Significant additional set up may be required to obtain new data or to correct existing errors.

This disclosure describes self-referencing sensors for aircraft monitoring. The following example implementations are described in the context of an aircraft. Similar implementations are possible for other moving assets, such as other vehicles for which monitoring is useful.

As described below, the self-referencing sensors (also identified as meta sensors) can be coupled to wireless aircraft sensors. The meta sensors can perceive their own labels, e.g., location, orientation and/or other relevant labels. The relevant labels can include, for example, the serial number of the component on which the meta sensor is installed, proximity to other sensors, environmental data to verify proper installation, or other labels. Sensing the serial number can allow a meta sensor to remain attached to a specific component since sensors can easily move from one aircraft to another as the component moves. Environmental data, e.g., vibration, can indicate that the sensor attachment mechanism, e.g., a fastener, is loose whereas properly installed sensors are not expected to exhibit such vibration. Each aircraft sensor can be associated with a respective meta sensor resulting in the label information sensed by the meta sensor being associated as metadata with the aircraft sensor's interpretation context, which can include, for example, the aircraft sensor's location, orientation, sensor type, calibration information or other information. The other information can include, for example, sensor type or types (e.g., force, strain, vibration, temperature, pressure humidity, frequency, or other parameter), sensor serial number, sensor calibration information, sensor range/sensitivity, sensor software configuration and version number, software qualification (e.g., design assurance level), information on sensor redundancy and agreement, algorithm used to generate derived data, available data sets (type and date/time), memory capacity and usage, manufacturing information (e.g., date of manufacture, lot number), repair history, operating history information such as total hours of use, charge/discharge cycles, environmental exposure, sensor health/usage assessment such as built-in-test (BIT), power consumption, operating temperature, battery state of charge and related health information, to name a few. Sensor identity information can include, for example, serial number and anti-counterfeiting data. In addition, the aircraft sensor can be self-aware about its sensing operations, for example, sensing aircraft parameters (pressure, temperature, acceleration, or other aircraft parameters) or other operations.

By associating meta sensors with aircraft sensors, a proper configuration of the aircraft sensors can be maintained. The sensors can provide aircraft data interrogator systems with sufficient context to determine if the sensors are appropriate to provide data for a specified function. The use of meta sensors can automate configuration control, thereby increasing a level of certainty in the configuration assignments of aircraft sensors to the monitoring channels while retaining the benefits of using wireless aircraft sensors. Automated configuration control can also allow for sensor changes and can abstract a functional layer which can use the data from the sensors themselves, allowing sensors and their associated functions to be edited (e.g., added or subtracted). Implementations of the subject matter described here can allow for and automate checking of proper installation, e.g., whether sensor was supposed to point up but is instead pointing down, and allow for management of wireless data bandwidth. For example, the operations can specify minimum rates at which they need data, priority and the system can manage across all operations. Operations can specify normal and degraded states, e.g., a preferred data rate such as every second and an acceptable data rate such as once every five seconds. Degraded states can be chosen when needed to ensure all operations of similar priority can be executed. Also, if a sensor has a low battery, then the wireless transmission rate can be throttled back to preserve battery life.

FIG. 1A is a schematic diagram of a first aircraft 100 on which wireless aircraft sensors and meta sensors have been mounted. Multiple wireless aircraft sensors (e.g., the first aircraft sensor 102a, the second aircraft sensor 102b, the third aircraft sensor 102c, the fourth aircraft sensor 102d, or more or fewer aircraft sensors) can be mounted on-board the aircraft 100. Each aircraft sensor can be configured to sense an aircraft parameter. The aircraft sensors can include at least one of an accelerometer to measure aircraft acceleration or acceleration of a component of the aircraft 100, a tachometer to measure a rotational speed of an engine of the aircraft 100, a vibration sensor, a thermometer to measure a temperature of a region or component in the aircraft 100, a humidity sensor to sense humidity of electronic or other aircraft components, a strain gauge to measure strain on structural members, e.g., in or near the fuselage, or other aircraft sensors. Alternative or additional aircraft sensors can include, for example, pressure sensor, oil debris sensor, spectrometer, optical sensors, blade trackers, fluid level sensors, fluid quality sensors (to sense chemical properties and/or contaminants), thermal imaging sensors, air data sensors (e.g., pitot/static pressure, temperature measurements), fiber optic sensors (such as fiber bragg gratings), ultrasonic actuators/sensors to measure structural health, acoustic emission sensors, micro electro-mechanical sensors (MEMS), displacement sensors, flow sensors, electrical current sensors, navigational sensors such as rate gyros, magnetometers, GPS receivers, radar altimeters, or combinations of them. In addition, a sensor node may only be used to identify the component to which it is attached, e.g., part number, serial number. Aircraft sensors can also include non-conventional sensors such as cameras, audio recorders or other non-conventional aircraft sensors.

In addition, each aircraft sensor can store information regarding one or more functions, e.g., aircraft monitoring functions, which the aircraft sensor can perform. Such functions can be provided to the aircraft sensor by one or more aircraft central system(s) or by a manufacturer by the aircraft sensor or by other sources. The stored information can include, for example, data acquisition rates, triggers, analysis algorithms to be used to interpret raw data sensed by the aircraft sensor or other information.

Multiple meta sensors (e.g., a first meta sensor 104a, a second meta sensor 104b, a third meta sensor 104c, a fourth meta sensor 104d, or more or fewer meta sensors) can be mounted on-board the aircraft 100. Each meta sensor, e.g., an inclinometer, a magnetometer, or other meta sensor can be associated with a respective aircraft sensor. Additional meta sensors can include RF receivers which determine relative signal strength and/or time of flight of signals from known fixed positions on the aircraft and can triangulate relative position. Alternatively, the meta sensor system can include an RF transmitter on the sensor module which is read by multiple receivers at known fixed positions on the aircraft. Some implementations can include optical or RF indications at fixed sensor locations which can be read by the meta sensor, for example, based on the RFID tag adjacent to a sensor which reported it was location "A," that sensor would report it was at known location "A" since only sensors installed in this location would be able to read that data. In some implementations, each meta sensor can provide its own orientation relative to earth. Each meta sensor's orientation can then be compared to the aircraft's orientation relative to earth to determine each meta sensor's orientation relative to the aircraft.

A data acquisition system 106 can be mounted on-board the aircraft and connected to the multiple aircraft sensors and the multiple meta sensors. The data acquisition system 106 can include a computer-readable medium storing instructions executable by one or more processors to perform operations. Each aircraft sensor can transmit to the data acquisition system 106, signals indicating one or more aircraft parameters that the aircraft sensor is configured to sense. In some implementations, each aircraft sensor can also store configuration information of the aircraft component on which it is installed. Each aircraft sensor can also transmit to the data acquisition system 106, signals indicating the stored information which the aircraft sensor can perform. Each meta sensor can transmit to the data acquisition system 106, signals indicating its self-location, for example, through structural dynamic response sensor/actuator networks. In some implementations, the data acquisition system 106 can identify aircraft monitoring operations that can be performed based on the signals received from the aircraft sensors and the meta sensors. Further, the data acquisition system 106 can perform all or a subset of the identified aircraft monitoring operations based, in part, on aircraft parameters sensed by one or more of the multiple aircraft sensors and on a location of the one or more of the multiple aircraft sensors determined by respective one or more of the meta sensors.

Figure 1B:
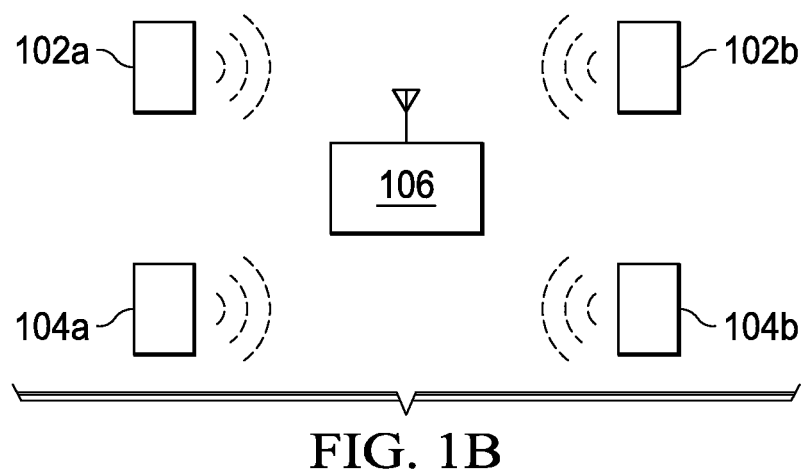
FIG. 1B is a schematic diagram of aircraft sensors and meta sensors communicating with a data acquisition system.

FIG. 1B is a schematic diagram of aircraft sensors and meta sensors communicating with the data acquisition system 106. In the implementation shown in the schematic diagram of FIG. 1B, an aircraft sensor (e.g., aircraft sensor 102a) and a meta sensor (e.g., 104a) with which the aircraft sensor is associated are not located at the same location on-board the aircraft 100. An alternative implementation is described below with reference to FIG. 2B. Also, in some implementations, each aircraft sensor and each meta sensor can communicate directly with the data acquisition system 106 without any intermediaries. Alternatively, each aircraft sensor and each meta sensor can communicate with the data acquisition system 106 through intermediaries. For a meta sensor, for example, an intermediary can include another meta sensor, an aircraft sensor or other intermediary. For example, the sensors can communicate with the data acquisition system 106 via a wireless mesh network topology or a star network topology.

Each meta sensor can be configured to determine a location on the aircraft of the respective aircraft sensor with which each meta sensor is associated. In some implementations, a meta sensor can self-locate using on-board location reference transmitters (e.g., a first location reference transmitter 108a, a second location reference transmitter 108b, or more or fewer transmitters). Each location reference transmitter can be mounted at a respective specified, i.e., known, location on-board the aircraft 100. For example, the first location reference transmitter 108a can be mounted on a roof of the aircraft 100, a second location reference transmitter 108b can be mounted on a tail of the aircraft 100, a third location reference transmitter (not shown) can be mounted near a seat of the aircraft 100, a fourth location reference transmitter (not shown) can be mounted on a nose of the aircraft 100. The multiple location reference transmitters can transmit reference signals. A meta sensor is configured to connect with one or more of the multiple location reference transmitters and to determine its own location based on one or more specified locations of the respective one or more of the multiple location reference transmitters.

For example, a meta sensor can use relative signal strength, time of flight, phase or a combination of two or more of them from the location reference transmitters to determine the location in three-dimensional (3D) space of the meta sensor relative to the aircraft by using triangulation or trilateration or multi-lateration algorithms. Alternatively, the transmitters/receivers can be reversed—the meta sensor could be a transmitter which is received by multiple location reference receivers. In some implementations, each of the meta sensor and the reference transmitter can serve as a transmitter and a receiver. In some implementations, a meta sensor can compare distance to other, nearby meta sensors or other signal sources to improve location accuracy. In some implementations, a meta sensor can self-locate using real time location systems (RTLS). In this manner, a meta sensor can self-locate based, in part, on reference signals from one or more of the location reference transmitters.

In some implementations, a meta sensor can self-locate using off-board systems, e.g., a Global Positioning System (GPS) satellite, Galileo, GLONASS satellites, combinations of them or other off-board systems a meta sensor can exchange location information. Self-location can be enhanced, for example, by implementing carrier-phase enhancement techniques (real time kinematics). In some implementations, the off-board systems can be ground-based reference location systems based on RF, optical/infrared or acoustic/ultrasonic beacons. In some implementations, a meta sensor can self-locate using a combination of on-board and off-board systems. Also, some meta sensors can self-locate using location reference transmitters, other meta sensors can self-locate using off-board systems, and remaining meta sensors can self-locate using a combination of the two.

A degree of precision with which a meta sensor can self-locate can vary. For example, a meta sensor can have a high degree of precision and pinpoint its exact location on-board the aircraft 100, such as the tail rotor assembly or the main rotor assembly or below the pilot's seat. In another example, a meta sensor can have a relatively lower degree of precision and determine that its location is within a specified distance from a known location. In such instances, the meta sensor can determine that its location is the same as the known location, such as the nose of the aircraft 100 or the tail of the aircraft 100, or other known location.

Some implementations of meta sensor self-location can be implemented using a general positioning system which can locate any point on the aircraft 100. Alternatively or in addition, the aircraft 100 can implement a specific positioning identification device on-board the aircraft 100 at locations at which sensors may be expected to be installed. Such devices can implement near field communication, e.g., radio frequency identification (RFID), contact memory, or other near field communication to determine locations of sensors. A meta sensor can detect a presence of a specific location identification device and determine that the meta sensor's self-location is in close proximity to the specific location identification device.

In some implementations, a meta sensor can determine a location and/or orientation of an aircraft sensor, with which the meta sensor is associated, based on its self-location. Each meta sensor can, in turn, communicate its own on-board aircraft location and/or orientation and the on-board aircraft location and/or orientation of each aircraft sensor to the data acquisition system 106. Alternatively or in addition, each meta sensor can communicate the information received from the one or more of the multiple location reference and/or orientation transmitters to the data acquisition system 106. The data acquisition system 106 can process the information to determine each meta sensor's on-board aircraft location and/or orientation and each sensor's on-board aircraft location and/or orientation. In some implementations, a meta sensor such as an inclinometer can determine an orientation of an aircraft sensor with which the inclinometer is associated relative to the ground or to the aircraft 100, for example, by comparison to an on-board aircraft inclinometer. Similarly, a magnetometer can determine the orientation of an aircraft sensor with which the magnetometer is associated relative to a reference magnetic field (Earth's magnetic field) or to the aircraft 100, for example, by comparison to an on-board aircraft magnetometer. In this manner, a two-way communication between a combination of aircraft sensors and meta sensors, and aircraft systems such as the data acquisition system 106 can allow for full understanding of aircraft sensor context.

Figure 2B:
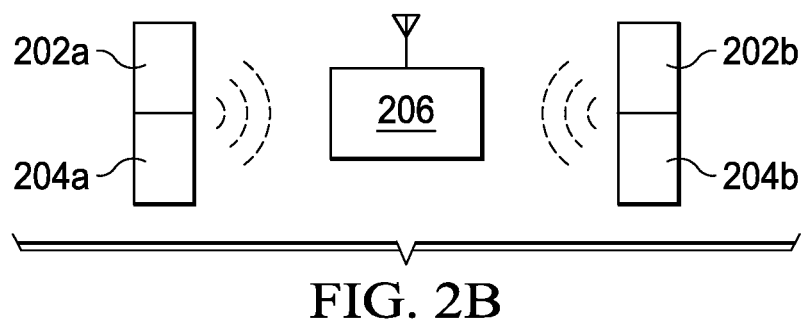
FIG. 2B is a schematic diagram of aircraft sensors and meta sensors communicating with a data acquisition system.
Figure 2A:
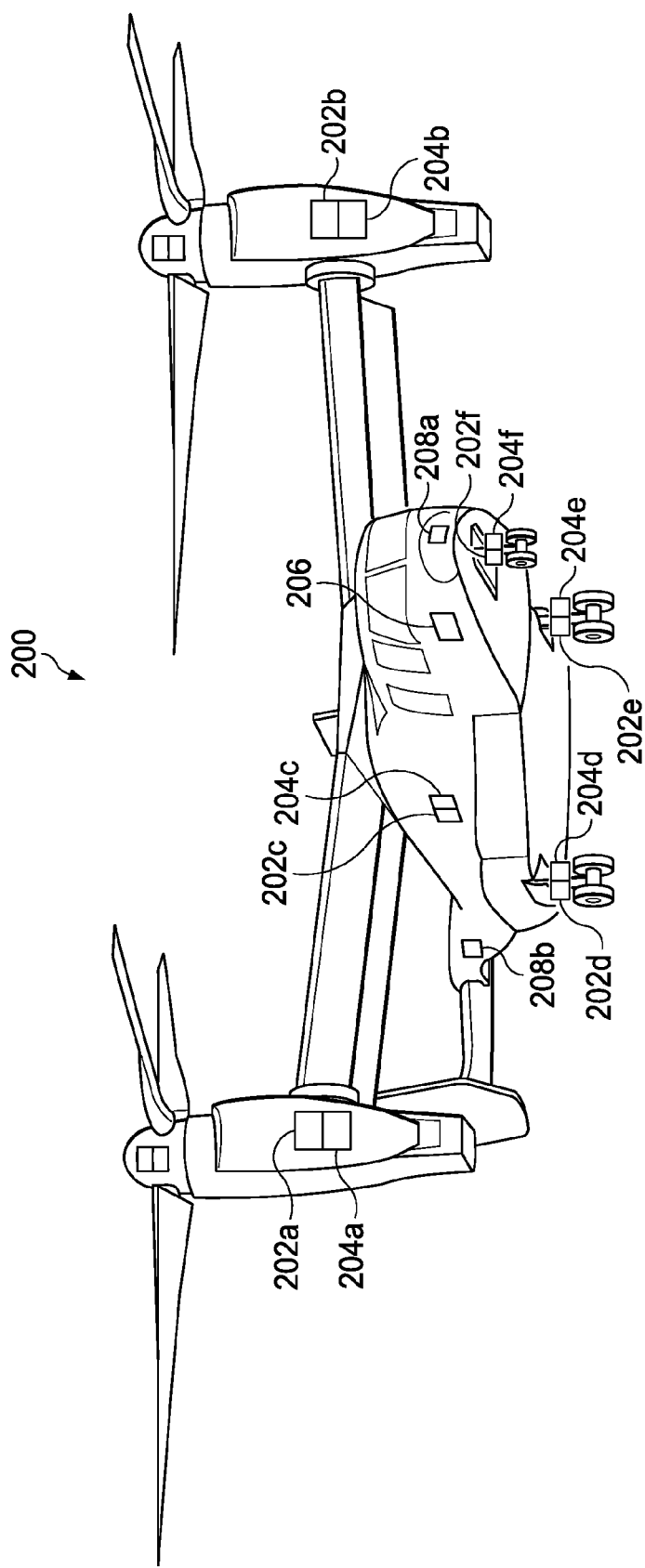
FIG. 2A is a schematic diagram of a second aircraft on which wireless aircraft sensors and meta sensors have been mounted.

FIG. 2A is a schematic diagram of a second aircraft 200 on which wireless aircraft sensors and meta sensors have been mounted. Multiple wireless aircraft sensors (e.g., a first aircraft sensor 202a, a second aircraft sensor 202b, a third aircraft sensor 202c, a fourth aircraft sensor 202d, a fifth aircraft sensor 202e, a sixth aircraft sensor 202f, and more or fewer aircraft sensors) can be mounted at different on-board locations on the aircraft 200. Corresponding meta sensors (e.g., a first meta sensor 204a, a second meta sensor 204b, a third meta sensor 204c, a fourth meta sensor 204d, a fifth meta sensor 204e, a sixth meta sensor 204f, and more or fewer meta sensors) can be mounted on-board the aircraft 200. The multiple aircraft sensors and the multiple meta sensors can be in a two-way communication with a data acquisition system 206. The aircraft sensors, meta sensors and data acquisition system 206 shown in FIG. 2A can operate similarly to the aircraft sensors, meta sensors and data acquisition system 106 shown in FIG. 1A.

FIG. 2B is a schematic diagram of aircraft sensors and meta sensors communicating with the data acquisition system 206. As shown in FIG. 2B, each aircraft sensor (e.g., the first aircraft sensor 202a, the second aircraft sensor 202b) and each corresponding meta sensor (e.g., the first meta sensor 204a, the second meta sensor 204b) can be co-located. For example, each aircraft sensor and corresponding meta sensor can be located in the same sensor housing. As described above, each meta sensor is configured to self-locate and transmit a self-location signal to the data acquisition system 206. The data acquisition system 206 can receive a self-location from a meta sensor identifying an on-board location on the aircraft 200 of the meta sensor, and determine that the aircraft sensor that is associated with the meta sensor is located at the identified on-board location. In some implementations, some meta sensors can be co-located with their respective aircraft sensors as shown in FIG. 2B while other meta sensors and their respective aircraft sensors can be located separately as shown in FIG. 1B.

Figure 3:
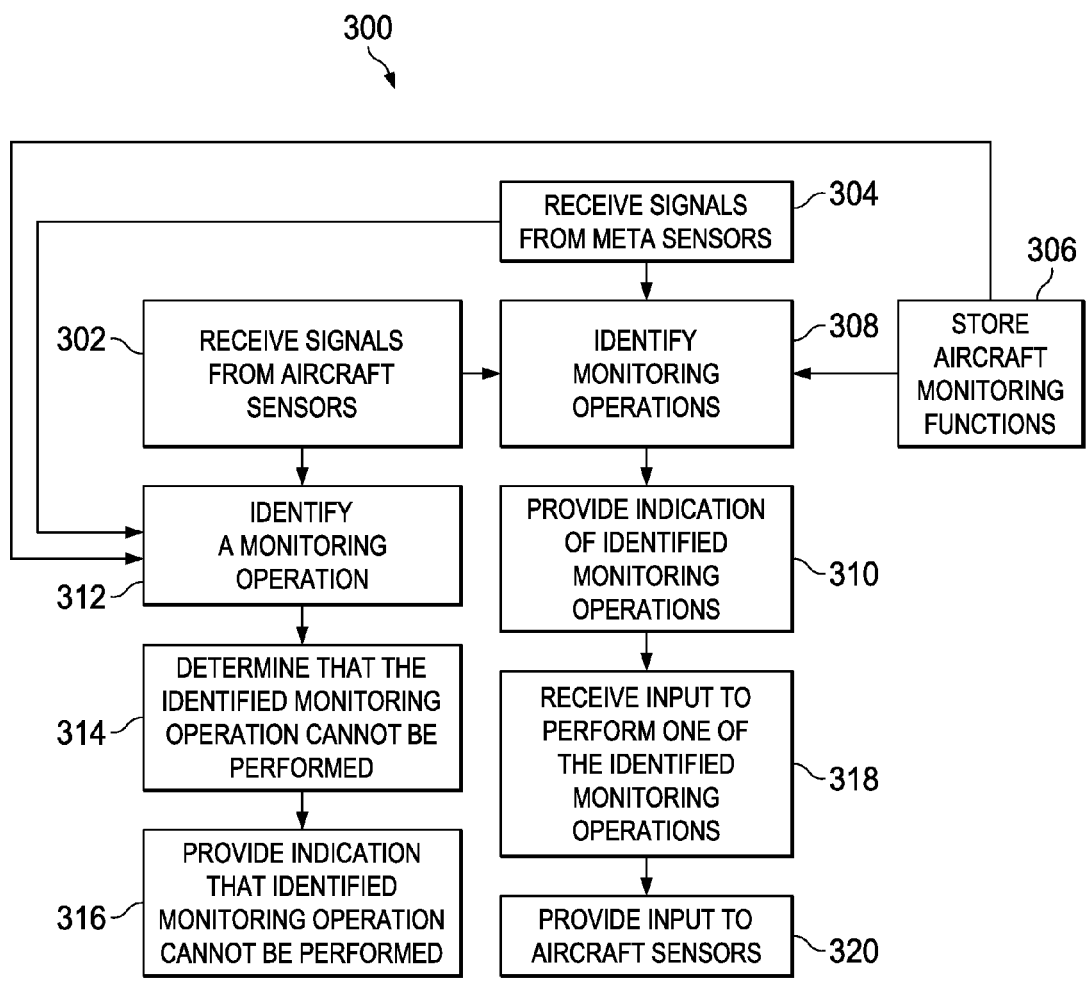
FIG. 3 is a flowchart of a process for aircraft monitoring.

FIG. 3 is a flowchart of a process 300 for aircraft monitoring. The process 300 can be implemented, in part, by the multiple aircraft sensors, multiple meta sensors, the data acquisition system and/or other on-board computer systems. The process 300 is described as being implemented by the data acquisition system 106. The process 300 can also be implemented by the data acquisition system 206. At 302, signals can be received from the aircraft sensors. For example, each aircraft sensor can transmit to the data acquisition system 106, signals indicating one or more aircraft parameters that the aircraft sensor is configured to sense. Each aircraft sensor can also transmit to the data acquisition system 106, signals indicating the stored information which the aircraft sensor can perform. At 304, signals can be received from the meta sensors. For example, each meta sensor can transmit to the data acquisition system 106, signals indicating its self-location. The aircraft sensors and the meta sensors can transmit the signals at a time of aircraft boot up (for example, to ensure that all aircraft sensors are functioning properly), at a time immediately before aircraft shutdown (for example, to determine if an orientation of a sensor has changed relative to boot up time), at any time in response to operator input, or periodically at specified intervals.

At 306, multiple aircraft monitoring functions can be stored. For example, the data acquisition system 106 or a different system in communication with the data acquisition system can store multiple aircraft monitoring operations, one or more aircraft sensors needed to perform each stored aircraft monitoring operation, and a location on-board the aircraft at which each of the one or more aircraft sensors needs to be to perform each aircraft monitoring operations.

At 308, aircraft monitoring operations can be identified. For example, the data acquisition system 106 can receive signals indicating aircraft parameters and functional capabilities from the aircraft sensors. The data acquisition system 106 can also receive signals indicating on-board locations of the aircraft sensors from the meta sensors. In response to receiving the signals, the data acquisition system 106 can identify one or more aircraft monitoring operations that an aircraft monitoring system can perform using the available aircraft sensors and their respective locations. To identify aircraft monitoring operations, the data acquisition system 106 can compare the stored aircraft sensors to the aircraft sensors identified by the signals received from the aircraft sensors. The data acquisition system 106 can also compare stored aircraft operations to aircraft operations that can be performed by the aircraft sensors from which the signals are received.

The aircraft monitoring operations can include, for example, rotor balance tracking implemented by accelerometers and tachometers. The operations can include vibration health monitoring implemented by accelerometers placed on components that experience a frequency, e.g., multiple sensors on multiple hangar bearings in a long shaft. The operations can include temperature and/or humidity sensing for aircraft components, e.g., electronics, implemented using temperature and/or humidity sensors. The operations can include strain measurement, for example, on structural members in the fuselage implemented using strain gauges coupled with meta sensors that can report both loads on the structures and the locations on which the loads are measured. The operations can include structural health monitoring implemented by ultrasonic or acoustic emission transducers.

In some implementations, the data acquisition system 106 can store one or more primary sensor locations or orientations (or both) needed to perform each stored aircraft monitoring operation. In addition, the data acquisition system 106 can store one or more secondary sensor locations or orientations (or both) which can serve as a backup sensor to the primary sensor if the primary sensor is either unavailable at start-up (for example, because the primary sensor has not been installed or is not working) or becomes unavailable during flight (for example, due to failure). The secondary sensor can perform the aircraft monitoring operation. The data acquisition system 106 can record information about the secondary sensor and a resulting accuracy. For example, if a primary sensor is not available, the data acquisition system 106 can specify a decrease in accuracy with which the secondary sensor performed the aircraft monitoring operation. Similarly, if multiple secondary sensors perform one or more aircraft monitoring operations in place of corresponding multiple primary sensors, the data acquisition system 106 can specify a decrease in accuracy with which the multiple secondary sensors performed the aircraft monitoring operations.

At 310, an indication of the identified monitoring operations can be provided. For example, the aircraft 100 can include one or more display panels that can display aircraft monitoring operations. The one or more display panels can be connected to the data acquisition system 106 or to the aircraft monitoring system (or both). Upon identifying the aircraft monitoring operations that can be performed based on the available aircraft sensors and their respective on-board aircraft locations, the data acquisition system 106 (or the aircraft monitoring system) can transmit signals representing the identified monitoring operations to the one or more display panels. The one or more display panels can then display the identified monitoring operations for an aircraft operator to view. If only non-optimal sensors for a monitoring operation are available, the display panels can display the degraded state of the affected monitoring operations. Alternatives or additions to on-board display panels can include ground station panels, portable panels, or other communication devices that implement communication including electronic mail, text messages or other communication.

At 312, an aircraft monitoring operation can be identified, and, at 314, it can be determined that the identified aircraft monitoring operation cannot be performed. For example, the data acquisition system 106 can store or have access to a list of one or more mandatory aircraft monitoring operations that must be performed at a particular time, such as, upon aircraft boot up, mid-flight, prior to landing, or at a different particular time. The data acquisition system 106 or the aircraft monitoring system can determine that one or more of these mandatory aircraft monitoring operations cannot be performed because, for example, the required aircraft sensor is unavailable or the aircraft sensor is not at the on-board location at which it needs to be to perform the mandatory operation or the aircraft sensor's signals do not indicate that the aircraft sensor is capable of performing the mandatory operation (e.g., a faulty sensor). At 316, an indication that the identified monitoring operation cannot be performed is provided. For example, the data acquisition system 106 or the aircraft monitoring system can cause the one or more display panels to display a notification indicating an unavailability of the mandatory monitoring operation, allowing the aircraft operator to take responsive action.

In some implementations, the data acquisition system 106 or the aircraft monitoring system can determine that new aircraft sensors are available to perform aircraft monitoring operations not performed (or not available to perform) during a previous flight. This can occur because, for example, new sensors were mounted on-board the aircraft, faulty sensors were fixed, or existing sensors were configured to sense new aircraft parameters. In some implementations, a previous aircraft sensor can be replaced with a new aircraft sensor that has the same functional capabilities of the previous aircraft sensor. In such implementations, the aircraft monitoring system can continue to implement the function of the new aircraft sensor without requiring additional manual set-up to integrate the new aircraft sensor with the remaining aircraft sensors.

At 318, input to perform one or more of the identified monitoring operations can be received, for example, from the aircraft operator by the aircraft monitoring system. At 320, the input can be provided to the aircraft sensors, for example, by the aircraft monitoring system. In some implementations, the inputs can include configuration information informing an aircraft sensor when/how to sense aircraft parameters to support the aircraft monitoring functions. For example, a vibration monitor at a specified location on-board the aircraft can be instructed to record vibration at a specified frequency if the temperature sensor senses a specified temperature and if the aircraft is sensed to be executing a specified flight maneuver.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Thus, particular implementations of the subject matter have been described. Other implementations are within the scope of the following claims. For example, the meta sensors can be wireless, wired or combinations of them. That is, a meta sensor can be wirelessly connected to the aircraft sensor with which the meta sensor is associated and wirelessly connected to the data acquisition system 106. Alternatively, a meta sensor can be hard-wired to both the aircraft sensor and the data acquisition system 106. In a further example, a meta sensor can be hard-wired to either the aircraft sensor or the data acquisition system 106 or be wirelessly connected to either the aircraft sensor or the data acquisition system 106. In some implementations, aircraft sensors can use metadata from other sensors (aircraft sensors or meta sensors) to refine an accuracy of their measurements.

In some implementations, a camera can be located on a portable device separate from the aircraft and used to take pictures and associate the pictures with the location and orientation of the camera relative to the aircraft when taking the picture. The information can be used to project the picture onto three-dimensional (3D) models of the aircraft to enable context identification, condition comparison, and optical identification of components and their associated data directly from the picture. The camera information can be used to evaluate photographic evidence of damage by projecting the photo onto a picture/model of the damage limits for the components identified from the photo metadata. For example, measurements, such as length, can be scaled from the photo based on the metadata information. In some implementations, a priori models or machine learning algorithms (e.g., neural networks or other machine learning algorithms) can be used to establish normal relationships between sensors and to identify if any of these relationships change to identify possible malfunctioning sensors.

In some implementations, the monitoring operations need not solely depend on location or orientation of an aircraft sensor. Instead, the monitoring operation can be within a range and the actual location or orientation as sensed by a meta sensor can be used as an input in the monitoring operation. For example, the monitoring operation can be configured based on where the aircraft sensor is located or oriented. Aircraft sensors can then be positioned at other locations on-board the aircraft. The data acquisition system or the aircraft monitoring system can execute an algorithm in the monitoring operation to adjust the monitoring operation to the actual location of the aircraft sensor instead of forcing the sensor to a specific location to meet the algorithm's requirements.

The invention claimed is:

1. An aircraft monitoring system comprising:
a plurality of wireless aircraft sensors mounted on-board an aircraft, each wireless aircraft sensor configured to sense an aircraft parameter;
a plurality of meta sensors mounted on-board the aircraft, each meta sensor associated with a respective wireless aircraft sensor, each meta sensor configured to determine a location or orientation on the aircraft of the respective wireless aircraft sensor with which each meta sensor is associated;
a data acquisition system mounted on-board the aircraft and connected to the plurality of wireless aircraft sensors and the plurality of meta sensors, the data acquisition system comprising a computer-readable medium storing instructions executable by one or more processors to perform operations comprising:
receiving the aircraft parameter(s) that each wireless aircraft sensor is configured to sense, a configuration information for each wireless aircraft sensor, and the determined location or orientation on the aircraft of each wireless aircraft sensor with which each meta sensor is associated,
identifying one or more aircraft monitoring operations that the aircraft monitoring system can perform using the received configuration information and the received locations or orientations on the aircraft,
performing the identified aircraft monitoring operations based, in part, on the received aircraft parameters sensed by one or more of the plurality of wireless aircraft sensors and on the received location or orientation of the one or more of the plurality of wireless aircraft sensors determined by respective one or more of the meta sensors.

2. The system of claim 1, wherein
the aircraft parameters are received from one or more of the plurality of wireless aircraft sensors via a first plurality of signals
the determined locations or orientations on the aircraft are received from one or more of the plurality of meta sensors via a second plurality of signals.

3. The system of claim 2, wherein identifying the one or more aircraft monitoring operations further comprises:
storing a plurality of aircraft monitoring operations, wherein one or more wireless aircraft sensors are configured to perform each stored aircraft monitoring operation, and storing a location or orientation onboard the aircraft of each of the one or more wireless aircraft sensors to perform each aircraft monitoring operation;
comparing the stored wireless aircraft sensors to the one or more of the plurality of wireless aircraft sensors from which the first plurality of signals are received; and
comparing the stored locations or orientations with the determined locations or orientations onboard the aircraft of the one or more of the plurality of wireless aircraft sensors.

4. The system of claim 2, wherein the operations further comprise:
identifying an aircraft monitoring operation to be performed;
identifying a wireless aircraft sensor to perform the identified aircraft monitoring operation;
identifying a location or orientation on-board the aircraft at which the identified wireless aircraft sensor is to be mounted to perform the identified aircraft monitoring operation;
in response to and based on the first plurality of signals or the second plurality of signals:
determining that the identified wireless aircraft sensor is not among the plurality of wireless aircraft sensors or that the identified wireless aircraft sensor is not mounted at the identified location or orientation onboard the aircraft,
in response to determining that the identified wireless aircraft sensor is not among the plurality of wireless aircraft sensors or that the identified wireless aircraft sensor is not mounted at the identified location or orientation onboard the aircraft, determining that the identified aircraft monitoring operation cannot be performed; and
providing a notification indicating that the identified aircraft monitoring operation cannot be performed.

5. The system of claim 2, wherein the first plurality of signals are received, the second plurality of signals are received and the one or more aircraft monitoring operations are identified at a time of aircraft boot up or at a time immediately before aircraft shut down.

6. The system of claim 2, wherein the operations by the data acquisition system further comprise providing, to on-board aircraft controllers, an indication of the identified one or more aircraft monitoring operations that the aircraft monitoring system can perform.

7. The system of claim 1, wherein one of the plurality of wireless aircraft sensors and one of the plurality of meta sensors and associated with the wireless aircraft sensor are housed in the same sensor housing, wherein the meta sensor is configured to self-locate or self-orient, and wherein the operations by the data acquisition system comprise:
receiving a self-location signal from the meta sensor identifying an on-board location on the aircraft of the meta sensor; and
determining that the wireless aircraft sensor is located at the identified on-board location.

8. The system of claim 1, further comprising a plurality of location reference transmitters mounted on-board the aircraft at respective specified locations, wherein a meta sensor is configured to connect with one or more of the plurality of location reference transmitters and to determine a location on the aircraft of a wireless aircraft sensor with which the meta sensor is associated based on one or more specified locations of the respective one or more of the plurality of location reference transmitters.

9. The system of claim 8, wherein a location reference transmitter is mounted on at least one of a nose of the aircraft, a tail of the aircraft, near a seat of the aircraft, on the left or the right of the aircraft, or near the top or the bottom of the aircraft.

10. The system of claim 1, wherein the plurality of meta sensors are configured to connect to a Global Positioning System (GPS), wherein a meta sensor is configured to determine a location or orientation on the aircraft of a wireless aircraft sensor with which the meta sensor is associated based on location information exchanged between the meta sensor and the GPS.

11. The system of claim 1, wherein a meta sensor is configured to implement nearfield communication to determine a location on the aircraft of a respective wireless aircraft sensor with which the meta sensor is associated.

12. The system of claim 11, wherein the near-field communication comprises radio frequency identification (RFID).

13. The system of claim 1, wherein the plurality of meta sensor comprise at least one of an inclinometer or a magnetometer.

14. The system of claim 1, wherein the plurality of meta sensors are wireless meta sensors.

15. The system of claim 1, wherein the aircraft monitoring operations comprise at least one of rotor balance tracking, vibration health monitoring, temperature sensing, humidity sensing, strain measurement, or structural health monitoring.

16. The system of claim 1, wherein the plurality of wireless aircraft sensors include at least two of an accelerometer, a tachometer, a thermometer, or a strain gauge.

17. A method comprising:
receiving a plurality of first signals from a plurality of wireless aircraft sensors mounted on-board an aircraft, the plurality of first signals identifying a plurality of aircraft parameters that the plurality of wireless aircraft sensors are configured to sense and a configuration information for the plurality of wireless aircraft sensors;
receiving a plurality of second signals from a plurality of meta sensors mounted on-board an aircraft, each meta sensor associated with a respective wireless aircraft sensor, the plurality of second signals identifying locations or orientations on the aircraft of the plurality of wireless aircraft sensors with which the plurality of meta sensors are associated;
determining the locations or orientations on the aircraft of the plurality of wireless aircraft sensors based, at least in part, on the plurality of second signals;
identifying one or more aircraft monitoring operations that can be performed using the received configuration information and the received locations or orientations on the aircraft; and
performing the identified aircraft monitoring operations based, in part, on the received aircraft parameters sensed by one or more of the plurality of wireless aircraft sensors and on the received location or orientation of the one or more of the plurality of wireless aircraft sensors determined by respective one or more of the meta sensors.

18. The method of claim 17, further comprising:
storing a plurality of aircraft monitoring operations, wherein one or more wireless aircraft sensors are configured to perform each stored aircraft monitoring operation, and storing a location or orientation onboard the aircraft of each of the one or more aircraft wireless sensors to perform each aircraft monitoring operation;
comparing the stored wireless aircraft sensors to the plurality of wireless aircraft sensors from which the plurality of first signals are received; and
comparing the stored locations or orientations on-board the aircraft with the determined locations or orientations on-board the aircraft of the plurality of aircraft sensors.

19. The method of claim 18, wherein the operations further comprise:
identifying an aircraft monitoring operation to be performed;
identifying a wireless aircraft sensor to perform the identified aircraft monitoring operation;
identifying a location or orientation on-board the aircraft at which the identified wireless aircraft sensor is to be mounted to perform the identified aircraft monitoring operation;
in response to and based on the first plurality of signals or the second plurality of signals:
determining that the identified wireless aircraft sensor is not among the plurality of wireless aircraft sensors or that the identified wireless aircraft sensor is not mounted at the identified location or orientation onboard the aircraft,
in response to determining that the identified wireless aircraft sensor is not among the plurality of wireless aircraft sensors or that the identified wireless aircraft sensor is not mounted at the identified location or orientation onboard the aircraft, determining that the identified aircraft monitoring operation cannot be performed; and
providing a notification indicating that the identified aircraft monitoring operation cannot be performed.

20. The method of claim 18, wherein the first plurality of signals are received, the second plurality of signals are received and the one or more aircraft monitoring operations are identified at a time of aircraft boot up or at a time immediately before aircraft shut down.

21. The method of claim 18, wherein the operations by the data acquisition system further comprise providing, to on-board aircraft controllers, an indication of the identified one or more aircraft monitoring operations that the aircraft monitoring system can perform.

22. The method of claim 17, wherein:
the aircraft parameters are received from one or more of the plurality of wireless aircraft sensors via a first plurality of signals;
the determined locations or orientations on the aircraft are received from one or more of the plurality of meta sensors via a second plurality of signals.

23. The method of claim 22, wherein the near-field communication comprises radio frequency identification (RFID).

24. The method of claim 17, wherein one of the plurality of wireless aircraft sensors and one of the plurality of meta sensors and associated with the wireless aircraft sensor are housed in the same sensor housing, wherein the meta sensor is configured to self-locate or self-orient, and wherein the operations by the data acquisition system comprise:
receiving a self-location signal from the meta sensor identifying an on-board location on the aircraft of the meta sensor; and
determining that the wireless aircraft sensor is located at the identified on-board location.

25. The method of claim 17, further comprising a plurality of location reference transmitters mounted on-board the aircraft at respective specified locations, wherein a meta sensor is configured to connect with one or more of the plurality of location reference transmitters and to determine a location on the aircraft of a wireless aircraft sensor with which the meta sensor is associated based on one or more specified locations of the respective one or more of the plurality of location reference transmitters.

26. The method of claim 25, wherein a location reference transmitter is mounted on at least one of a nose of the aircraft, a tail of the aircraft, near a seat of the aircraft, on the left or the right of the aircraft, or near the top or the bottom of the aircraft.

27. The method of claim 17, wherein the plurality of meta sensors are configured to connect to a Global Positioning System (GPS), wherein a meta sensor is configured to determine a location or orientation on the aircraft of a wireless aircraft sensor with which the meta sensor is associated based on location information exchanged between the meta sensor and the GPS.

28. The method of claim 17, wherein a meta sensor is configured to implement nearfield communication to determine a location on the aircraft of a respective wireless aircraft sensor with which the meta sensor is associated.

29. The method of claim 17, wherein the plurality of meta sensor comprise at least one of an inclinometer or a magnetometer.

30. The method of claim 17, wherein the plurality of meta sensors are wireless meta sensors.

31. The method of claim 17, wherein the aircraft monitoring operations comprise at least one of rotor balance tracking, vibration health monitoring, temperature sensing, humidity sensing, strain measurement, or structural health monitoring.

32. The method of claim 17, wherein the plurality of wireless aircraft sensors include at least two of an accelerometer, a tachometer, a thermometer, or a strain gauge.

33. A non-transitory computer-readable medium storing instructions executable by one or more processors to perform operations comprising:
   receiving a plurality of first signals from a plurality of wireless aircraft sensors mountable on-board an aircraft, the plurality of first signals identifying a plurality of aircraft parameters that the plurality of wireless aircraft sensors are configured to sense and a configuration information for the plurality of wireless aircraft sensors;
   receiving a plurality of second signals from a plurality of meta sensors mounted on-board an aircraft, each meta sensor associated with a respective wireless aircraft sensor, the plurality of second signals identifying locations or orientations on the aircraft of the plurality of wireless aircraft sensors with which the plurality of meta sensors are associated;
   determining the locations on the aircraft of the plurality of wireless aircraft sensors based, at least in part, on the plurality of second signals;
   identifying one or more aircraft monitoring operations that can be performed using the received configuration information and the received locations or orientations on the aircraft; and
   performing the identified aircraft monitoring operations based, in part, on the received aircraft parameters sensed by one or more of the plurality of wireless aircraft sensors and on the received location or orientation of the one or more of the plurality of wireless aircraft sensors determined by respective one or more of the meta sensors.

34. The non-transitory computer-readable medium of claim 33, wherein:
   the aircraft parameters are received from one or more of the plurality of wireless aircraft sensors via a first plurality of signals;
   the determined locations or orientations on the aircraft are received from one or more of the plurality of meta sensors via a second plurality of signals.

35. The non-transitory computer-readable medium of claim 34, wherein identifying the one or more aircraft monitoring operations further comprises:
   storing a plurality of aircraft monitoring operations, wherein one or more wireless aircraft sensors are configured to perform each stored aircraft monitoring operation, and storing a location or orientation onboard the aircraft of each of the one or more wireless aircraft sensors to perform each aircraft monitoring operation;
   comparing the stored wireless aircraft sensors to the one or more of the plurality of wireless aircraft sensors from which the first plurality of signals are received; and
   comparing the stored locations or orientations with the determined locations or orientations onboard the aircraft of the one or more of the plurality of wireless aircraft sensors.

36. The non-transitory computer-readable medium of claim 34, wherein the operations further comprise:
   identifying an aircraft monitoring operation to be performed;
   identifying a wireless aircraft sensor to perform the identified aircraft monitoring operation;
   identifying a location or orientation on-board the aircraft at which the identified wireless aircraft sensor is to be mounted to perform the identified aircraft monitoring operation;
   in response to and based on the first plurality of signals or the second plurality of signals:
      determining that the identified wireless aircraft sensor is not among the plurality of wireless aircraft sensors or that the identified wireless aircraft sensor is not mounted at the identified location or orientation onboard the aircraft,
      in response to determining that the identified wireless aircraft sensor is not among the plurality of wireless aircraft sensors or that the identified wireless aircraft sensor is not mounted at the identified location or orientation onboard the aircraft, determining that the identified aircraft monitoring operation cannot be performed; and
      providing a notification indicating that the identified aircraft monitoring operation cannot be performed.

37. The non-transitory computer-readable medium of claim 34, wherein the first plurality of signals are received, the second plurality of signals are received and the one or more aircraft monitoring operations are identified at a time of aircraft boot up or at a time immediately before aircraft shut down.

38. The non-transitory computer-readable medium of claim 34, wherein the operations by the data acquisition system further comprise providing, to on-board aircraft controllers, an indication of the identified one or more aircraft monitoring operations that the aircraft monitoring system can perform.

39. The non-transitory computer-readable medium of claim 33, wherein one of the plurality of wireless aircraft sensors and one of the plurality of meta sensors and associated with the wireless aircraft sensor are housed in the same sensor housing, wherein the meta sensor is configured to self-locate or self-orient, and wherein the operations by the data acquisition system comprise:
   receiving a self-location signal from the meta sensor identifying an on-board location on the aircraft of the meta sensor; and
   determining that the wireless aircraft sensor is located at the identified on-board location.

40. The non-transitory computer-readable medium of claim 33, further comprising a plurality of location reference transmitters mounted on-board the aircraft at respective specified locations, wherein a meta sensor is configured to connect with one or more of the plurality of location reference transmitters and to determine a location on the aircraft of a wireless aircraft sensor with which the meta sensor is associated based on one or more specified locations of the respective one or more of the plurality of location reference transmitters.

41. The non-transitory computer-readable medium of claim 40, wherein a location reference transmitter is mounted on at least one of a nose of the aircraft, a tail of the aircraft, near a seat of the aircraft, on the left or the right of the aircraft, or near the top or the bottom of the aircraft.

42. The non-transitory computer-readable medium of claim 33, wherein the plurality of meta sensors are configured to connect to a Global Positioning System (GPS), wherein a meta sensor is configured to determine a location or orientation on the aircraft of a wireless aircraft sensor with which the meta sensor is associated based on location information exchanged between the meta sensor and the GPS.

43. The non-transitory computer-readable medium of claim 33, wherein a meta sensor is configured to implement nearfield communication to determine a location on the aircraft of a respective wireless aircraft sensor with which the meta sensor is associated.

44. The non-transitory computer-readable medium of claim 43, wherein the near-field communication comprises radio frequency identification (RFID).

45. The non-transitory computer-readable medium of claim 33, wherein the plurality of meta sensor comprise at least one of an inclinometer or a magnetometer.

46. The non-transitory computer-readable medium of claim 33, wherein the plurality of meta sensors are wireless meta sensors.

47. The non-transitory computer-readable medium of claim 33, wherein the aircraft monitoring operations comprise at least one of rotor balance tracking, vibration health monitoring, temperature sensing, humidity sensing, strain measurement, or structural health monitoring.

48. The non-transitory computer-readable medium of claim 33, wherein the plurality of wireless aircraft sensors include at least two of an accelerometer, a tachometer, a thermometer, or a strain gauge.

* * * * *